US008905669B2

United States Patent
Eisenhut

(10) Patent No.: US 8,905,669 B2
(45) Date of Patent: Dec. 9, 2014

(54) DISPENSING APPARATUS INCLUDING AN APPLICATOR AND SHIELD FOR PHOTOCURABLE RESINS

(75) Inventor: Anthony R. Eisenhut, Lansing, NY (US)

(73) Assignee: Medhesives, Inc., Ithaca, NY (US)

( * ) Notice: Subject to any disclaimer, the term of this patent is extended or adjusted under 35 U.S.C. 154(b) by 2194 days.

(21) Appl. No.: 11/294,331

(22) Filed: Dec. 6, 2005

(65) Prior Publication Data
US 2006/0118198 A1 Jun. 8, 2006

Related U.S. Application Data

(60) Provisional application No. 60/633,097, filed on Dec. 6, 2004.

(51) Int. Cl.
*A47L 13/30* (2006.01)

(52) U.S. Cl.
USPC .............................................. 401/263

(58) Field of Classification Search
USPC ................................. 401/261–263
See application file for complete search history.

(56) References Cited

U.S. PATENT DOCUMENTS

| 2,982,987 | A | * | 5/1961 | Knapp | 401/139 |
| 4,682,950 | A | * | 7/1987 | Dragan | 433/90 |
| 6,083,002 | A | * | 7/2000 | Martin et al. | 433/90 |
| 6,116,901 | A | * | 9/2000 | Kangasniemi | 433/89 |

\* cited by examiner

*Primary Examiner* — Huyen Le
(74) *Attorney, Agent, or Firm* — Welsh Flaxman & Gitler LLC

(57) ABSTRACT

A dispensing apparatus includes a container having a storage reservoir containing a photocurable resin material, a dispensing nozzle secured to the container and an applicator shield positioned about the dispensing nozzle to shield dispensed resin from exposure to light.

20 Claims, 1 Drawing Sheet

DISPENSING APPARATUS INCLUDING AN APPLICATOR AND SHIELD FOR PHOTOCURABLE RESINS

CROSS REFERENCE TO RELATED APPLICATIONS

This application is based upon U.S. Provisional Patent Application Ser. No. 60/633,097, filed Dec. 6, 2004, entitled "APPLICATOR AND SHIELD FOR PHOTOCURABLE RESINS".

BACKGROUND OF THE INVENTION

1. Field of the Invention

The present invention relates to a dispensing apparatus for applying a radiation sensitive resin that cures upon exposure to visible light (or other wave energy sources). The dispensing apparatus includes a content applicator shield which protects the resin during application.

2. Description of the Prior Art

Conventionally, photocurable materials are liquid or semi-liquid materials that are curable upon exposure to selective electromagnetic radiation, i.e., wavelengths of light that effects curing in the material. Examples of photocurable materials include dental adhesives and primers, crown build-up material and sealants. Such materials have a photoinitiator (such as camphor quinone ("CPQ")) that initiates curing when exposed to radiation. Photocurable materials may also be employed in non-dental applications. For example, photocurable materials are known to be used in medical preparations as well as compositions intended for household, commercial or industrial applications.

The viscosity of the photocurable material must be within a range of values such that it is easily dispersed by squeezing portions of the side wall of a squeeze tube. The viscosity of these materials generally ranges from approximately 100 centipoise to 1200 centipoise.

Photocurable resins are packaged in various containers. The packages often control the amount of light entering the container. However, packaging concerned with limiting the exposure to light once the resin is dispensed is not available.

In the present invention, no mixing of the material being dispensed is required. As such, the material begins to cure upon exposure to light. Therefore, a need exists for a dispensing apparatus which includes an applicator which also functions to shield the resin as it is being dispensed and applied to a surface.

SUMMARY OF THE INVENTION

It is an object of the present invention to provide a dispensing apparatus capable of discharging a radiation sensitive resin onto a surface to be repaired while shielding the resin from visible light, so the resin and be worked with and properly applied prior to curing.

It is also an object of the present invention to provide a dispensing apparatus with an applicator shield at its dispensing end, wherein the applicator shield substantially covers the viscous material being dispensed from exposure to light.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
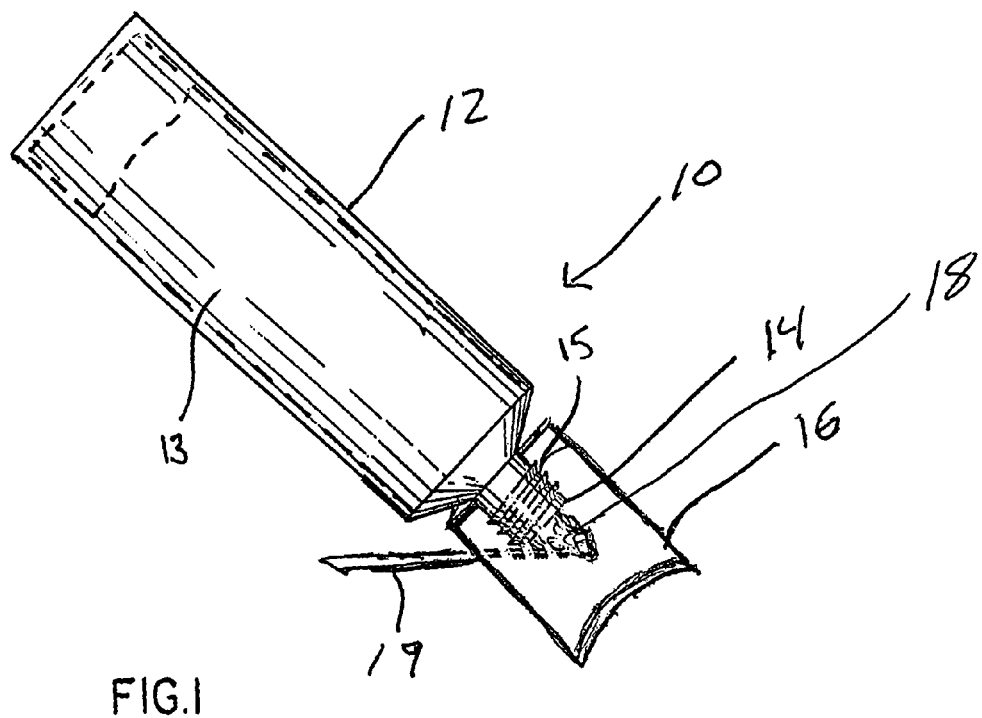
FIG. 1 is a diagram showing a squeeze dispensing apparatus with a curved applicator shield over the delivery nozzle.

FIG. 1 shows a dispensing apparatus 10 in accordance with a preferred embodiment of the present invention. The dispensing apparatus 10 includes a container 12 having a storage reservoir 13. The container 12 is preferably formed from a resilient plastic allowing one to squeeze the container 12 walls for dispensing of the contents thereof. A dispensing nozzle 14 and an applicator shield 16 are positioned at the dispensing end of the container 12. The dispensing nozzle 14 is integrally formed with the container 12. However, it is contemplated that the dispensing nozzle could be formed as a separate element which is attachable to container by various means such as screw threads, without departing from the spirit of the present invention.

The container 12 functions as a storage reservoir 13 for a photocurable resin material 18, which can function as a filler, sealant, and/or adhesive. When the resin 18 is dispensed from nozzle 14, it is partially shielded from the surrounding ambient light by the applicator shield 16. As shown, the applicator shield 16 is curved to block more light. The applicator shield 16 is also shaped and dimensioned to spread and finish the resin material 18 as it is applied to a desired surface 19. The applicator shield 16 avoids total exposure of the resin 18 to light and thus prolongs the period of time the resin 18 is workable before curing. This is very important as photocurable resins often cure very quickly when exposed to light. The applicator shield 16 can be made from various materials such as plastics or metals as long as the material is sufficient rigid to control the spreading and feathering of the resin 18.

With the foregoing in mind, and in accordance with a preferred embodiment, the applicator shield 18 is substantially opaque and is shaped and dimensioned to extend about the nozzle 14 in a manner permitting application of the resin material 18 to a desired surface via the nozzle 14. The nozzle 14 is a conventional drip type nozzle and is provided with external threading 15 for the application of a cap (not shown) when the nozzle 14 is not in use.

As discussed above, and in accordance with a preferred embodiment, it is contemplated the applicator shield 16, container 12 and dispensing nozzle 14 are integrally formed. However, and as those skilled in the art will certainly appreciate, it is contemplated the applicator shield 16 could be made as a separate part attachable to the container 12 or the nozzle 14 prior to dispensing. This would allow for more compact shipping and aid in preventing damage to the applicator shield 16 prior to use.

Figure 2:
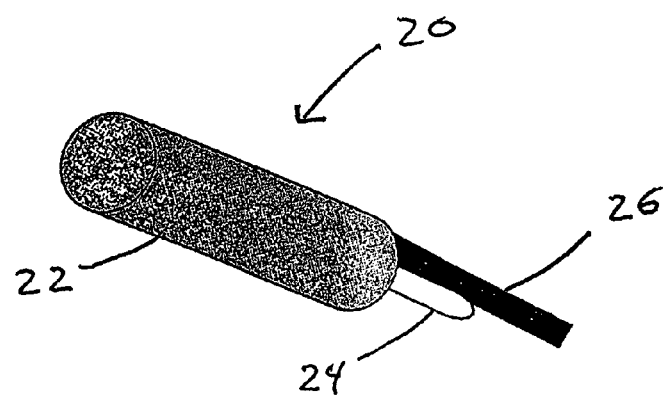
FIG. 2 is a diagram showing a caulk like tube dispensing apparatus with a flat applicator shield.

A second embodiment 20 of the invention is shown in FIG. 2. The container 22 resembles a caulk dispensing tube and includes a delivery nozzle 24 with a flat applicator shield 26 attached thereto.

While the preferred embodiment has been shown and described, it will be understood that there is no intent to limit the invention by such disclosure, but rather, is intended to cover all modifications and alternate constructions falling within the spirit and scope of the invention.

The invention claimed is:

1. A dispensing apparatus, comprising:
   a container having a storage reservoir containing a photocurable resin material;
   a dispensing nozzle secured to the container; and
   an applicator shield positioned about the dispensing nozzle to shield dispensed resin from exposure to light.

2. The dispensing apparatus according to claim 1, wherein the dispensing nozzle is integrally formed with the container.

3. The dispensing apparatus according to claim 1, wherein the photocurable resin functions as a filler, sealant, or adhesive.

4. The dispensing apparatus according to claim 1, wherein the applicator shield is curved to block more light.

5. The dispensing apparatus according to claim 1, wherein the applicator shield is shaped and dimensioned to spread and finish the photocurable resin material.

6. The dispensing apparatus according to claim 1, wherein the applicator shield is composed of plastics or metals.

7. The dispensing apparatus according to claim 1, wherein the applicator shield is opaque and is shaped and dimensioned to extend about the nozzle in a manner permitting application of the resin material to a desired surface via the nozzle.

8. A dispensing apparatus, comprising:
   a container having a storage reservoir containing a photocurable resin material;
   a dispensing nozzle secured to the container; and
   an applicator shield connected to either the container or dispensing nozzle during dispensing of the resin material and positioned about the dispensing nozzle to shield from exposure to light resin dispensed from the dispensing nozzle onto a desired surface to be treated with the resin.

9. The dispensing apparatus according to claim 8, wherein the photocurable resin functions as a filler, sealant, or adhesive.

10. The dispensing apparatus according to claim 8, wherein the applicator shield is curved to block more light.

11. The dispensing apparatus according to claim 8, wherein the applicator shield is shaped and dimensioned to spread and finish the photocurable resin material.

12. The dispensing apparatus according to claim 8, wherein the applicator shield is composed of plastics or metals.

13. The dispensing apparatus according to claim 8, wherein the applicator shield is opaque and is shaped and dimensioned to extend about the nozzle in a manner permitting application of the resin material to the desired surface via the nozzle.

14. The dispensing apparatus according to claim 8, wherein the dispensing nozzle is integrally formed with the container.

15. .A dispensing apparatus, comprising:
   a container having a storage reservoir containing a photocurable resin material;
   a dispensing nozzle secured to the container; and
   an applicator shield positioned about the dispensing nozzle to shield from exposure to light resin dispensed from the dispensing nozzle onto a desired surface to be treated with the resin.

16. The dispensing apparatus according to claim 15, wherein the dispensing nozzle is integrally formed with the container.

17. The dispensing apparatus according to claim 15, wherein the applicator shield is curved to block more light.

18. The dispensing apparatus according to claim 15, wherein the applicator shield is shaped and dimensioned to spread and finish the photocurable resin material.

19. The dispensing apparatus according to claim 15, wherein the applicator shield is opaque and is shaped and dimensioned to extend about the nozzle in a manner permitting application of the resin material to the desired surface via the nozzle.

20. The dispensing apparatus according to claim 15, wherein the applicator shield is composed of plastics or metals.

\* \* \* \* \*